United States Patent [19]

Oomori et al.

[11] Patent Number: 4,710,937

[45] Date of Patent: Dec. 1, 1987

[54] LASER SYSTEM

[75] Inventors: Tatsuo Oomori; Kouichi Ono; Shigeto Fujita, all of Hyogo, Japan

[73] Assignee: Mitsubishi Denki Kabushiki Kaisha, Tokyo, Japan

[21] Appl. No.: 851,219

[22] Filed: Apr. 14, 1986

[30] Foreign Application Priority Data

Jun. 13, 1985 [JP] Japan .................................. 60-127249
Jun. 13, 1985 [JP] Japan .................................. 60-127250

[51] Int. Cl.$^4$ .............................................. H01S 3/20
[52] U.S. Cl. .......................................... 372/53; 372/97
[58] Field of Search ............................... 372/53, 97, 92

[56] References Cited

U.S. PATENT DOCUMENTS

| | | | |
|---|---|---|---|
| 3,753,148 | 8/1973 | Billman | 372/97 |
| 3,969,684 | 7/1976 | de Witte et al. | 372/97 |
| 4,410,995 | 10/1983 | Chin | 372/97 |

Primary Examiner—Leon Scott, Jr.
Attorney, Agent, or Firm—Bernard, Rothwell & Brown

[57] ABSTRACT

A dye laser system for emitting laser beams of various wavelengths, which includes a plurality of dye vessels apart from each other and a mirror for oscillating the laser beams and for reflecting the beams to a beam splitter. Two wavelength selectors are provided for directing a specific wavelength portion of the beams to the beam splitter and for directing a specific wavelength portion of the beams to the mirror.

29 Claims, 10 Drawing Figures

LASER SYSTEM

BACKGROUND OF THE INVENTION

1. Field of the Invention

The present invention relates to a dye laser using dyes as laser materials. Particularly, it is concerned with a laser system for emitting laser beams of various wavelengths.

2. Description of the Prior Art

Figure 1:
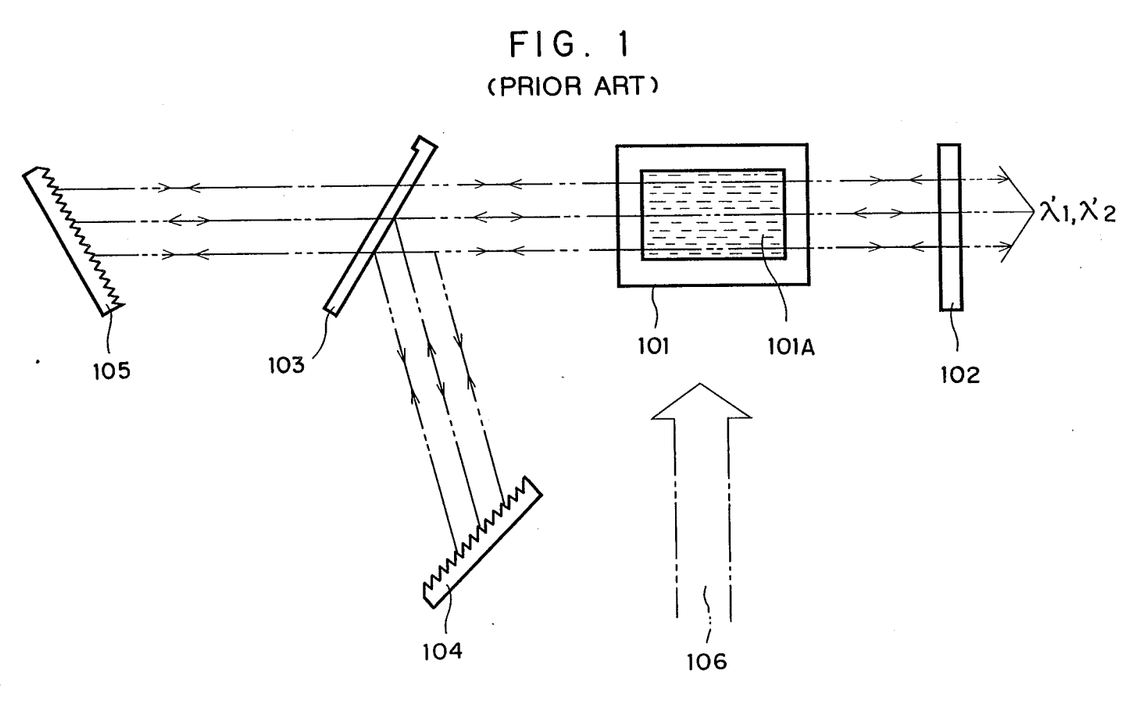
FIG. 1 illustrates a construction of a conventional multi-wavelength laser system.

FIG. 1 illustrates a conventional multi-wavelength laser system which is shown for example in "Optics Communications," Vol. 7 (1973), p. 233. In the figure, the numeral 101 denotes a light transmitting, dye vessel which contains a dye solution 101A consisting of a dye as a laser material and a solvent; numeral 102 denotes an output mirror which not only outputs laser beams of wavelengths $\lambda_1'$ and $\lambda_2'$ but also is used in an optical resonance system; numeral 103 denotes a beam splitter disposed on a side opposite to the side where the output mirror 102 is located with respect to the dye vessel 101; numeral 104 denotes a diffraction grating disposed in a position where it receives light wave reflected by the beam splitter 103 and reflects diffractively a light wave portion of wavelength $\lambda_1'$ selectively at a high reflectance; and numeral 105 denotes a diffraction grating disposed in a position where it receives light wave which has passed through the beam splitter 103 and reflects diffractively a light wave portion of wavelength $\lambda_2'$ selectively at a high reflectance. If necessary, a polarizer, ND filter, or beam expander, is disposed between the beam splitter 103 and the diffraction grating 104 and between the beam splitter 103 and the diffraction grating 105. An optical resonator for the light wave of wavelength $\lambda_1'$ is constituted by the dye vessel 101 containing the dye solution 101A, output mirror 102, beam splitter 103 and diffraction grating 104, while an optical resonator for the light wave of wavelength $\lambda_2'$ is constituted by the dye vessel 101 containing the dye solution 101A, output mirror 102, beam splitter 103 and diffraction grating 105.

The operation of the above conventional laser system will now be described. A pumping light 106 emitted from a pumping light source (not shown) and condensed through an optical system (not shown) irradiates the dye solution A in the dye vessel 101. As a result, the dye in the dye solution 101A assumes a state of population inversion and a light wave of a specific wavelength region is generated from the dye. The diffraction grating 104 is turned and adjusted for the light wave incident thereon so that the reflectance of the light wave of wavelength $\lambda_1'$ becomes maximum, while the diffraction grating 105 is turned and adjusted for the light wave incident thereon so that the reflectance of the light wave of wavelength $\lambda_2'$ becomes maximum. The light wave of wavelength $\lambda_1'$ is generated as a laser beam by the above optical resonator comprising the components from the output mirror 102 up to the diffraction grating 104, while the light wave of wavelength $\lambda_2'$ is generated as a laser beam by the above optical resonator comprising the components from the output mirror 102 up to the diffraction grating 105. The light waves of wavelength $\lambda_1'$ and $\lambda_2'$ are output from the output mirror 102 as laser beams having wavelengths $\lambda_1'$ and $\lambda_2'$ respectively.

Since the conventional laser system for generating multi-wavelength light waves is constructed as above, the wavelength region of light waves capable of being generated is determined by a single dye solution in a single dye vessel and it is only about 80 nm at most (the difference between the wavelengths $\lambda_1'$ and $\lambda_2'$ being within about 80 nm). Besides, since light waves of plural wavelengths are generated by the same dye solution, the interaction between the generated light waves is strong due to pull-in phenomenon, thus making it impossible to obtain stable output power, output waveform and generation timing. Further, because of use of a beam splitter, the loss of light waves generated is large and therefore a laser beam of a sufficient intensity is not obtainable.

SUMMARY OF THE INVENTION

The present invention has been effected for eliminating the above problems. It is an object of the present to provide a laser system capable of generating as laser beams plural wavelengths of light waves having a wavelength spacing exceeding the wavelength region of light waves obtained by pumping of a single dye of a single concentration, and capable of weakening the interaction of the light waves generated, thereby permitting a stable laser oscillation and affording a laser beam of a sufficient intensity.

The laser system of the present invention includes a plurality of dye vessels disposed in series at predetermined intervals and containing different dye solutions; a translucent output mirror disposed on one side of the dye vessels and used not only for outputting laser beams but also for laser oscillation; reflecting mirror means or light wave splitting means, e.q. beam splitter, disposed between the dye vessels and having a window formed centrally; first wavelength selecting means positioned so that a specific wavelength portion of beam reflected by the light wave splitting means is reflected toward the light wave splitting means selectively at a high reflectance; and a second wavelength selecting means disposed on the other side of the dye vessels for reflecting a specific wavelength beam toward the output mirror selectively at a high reflectance.

BRIEF DESCRIPTION OF THE DRAWINGS

FIGS. 3(A) and (B) are construction diagrams showing pumping means for generating pumping lights;

DETAILED DESCRIPTION OF THE PREFERRED EMBODIMENTS

Figure 2:
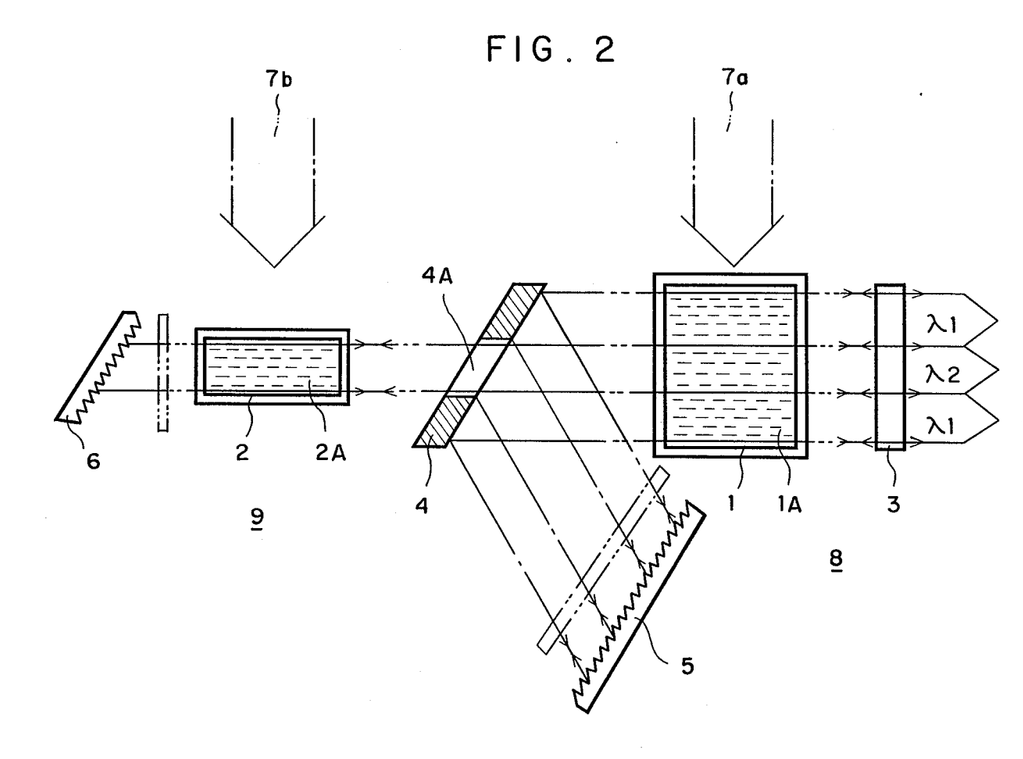
FIG. 2 is a sectional construction diagram illustrating a first embodiment of the present invention.

Referring to FIG. 2, there is illustrated a construction of a laser system according to a first embodiment of the present invention, in which the numeral 1 denotes a first light transmitting, dye vessel which contains a first dye solution 1A consisting of a first dye known as a laser material for generating a first light wave of wavelength $\lambda_1$ and a solvent for the first dye; numeral 2 denotes a second light transmitting, dye vessel which contains a second dye solution 2A consisting of a second dye known as a laser material for generating a second light wave of wavelength $\lambda_2$ (provided the second dye is different from the first dye) and a solvent for the second dye, the first and second dye vessels 1 and 2 being disposed in series on a single straight line at a predetermined spacing. The first and second dye vessels 1 and 2 contain the respective dyes in such a combination that the wavelength $\lambda_1$ of the first light wave is shorter than the wavelength $\lambda_2$ of the second light wave. The difference between the wavelengths $\lambda_1$ and $\lambda_2$ is larger than the maximum difference in wavelength between multi-wavelength laser beams emitted by a single solution of a single dye. Numeral 3 denotes a translucent output mirror disposed in a position opposed to the first dye vessel 1. The output mirror 3 not only outputs laser beams corresponding to the first and second light waves of wavelength $\lambda_1$ and $\lambda_2$ respectively but also is used for the generation of those light waves as laser beams. Numeral 4 denotes a reflecting mirror having a window 4A formed of a light transmitting material, the reflecting mirror 4 being disposed between the first and second dye vessels 1 and 2 so that a reflection surface thereof is in an inclined and opposed relation to the reflection surface of the output mirror 3. Numeral 5 denotes a first wavelength selecting means positioned so that it receives and reflects the light wave of wavelength $\lambda_1$ reflected by the windowed reflecting mirror 4, selectively at a high reflectance. A Littrow type first diffraction grating is used as the first wavelength selecting means 5. Numeral 6 denotes a second wavelength selecting means positioned so that it receives and reflects the light wave of wavelength $\lambda_2$ which has been reflected by the output mirror 3 and passed through the window 4A, selectively at a high reflectance, the position of the second wavelength selecting means being adjacent to the second dye vessel 2. A Littrow type second diffraction grating is used as the second wavelength selecting means 6. Numerals 7a and 7b denote pumping lights for pumping the first and second dyes in the first and second dye vessels 1 and 2. The pumping light 7a is incident upon the first dye solution 1A sideways as shown in the figure, while the pumping light 7b is incident upon the second dye solution 2A sideways also as shown in the figure.

In the above-constructed laser system for oscillating multi-wavelength light waves as laser beams, an optical resonator 8 for oscillating the first light wave of wavelength $\lambda_1$ is constituted by the output mirror 3, the first dye vessel 1 containing the first dye solution 1A, the reflection surface of the windowed reflecting mirror 4 and the first diffraction grating 5, while an optical resonator 9 for oscillating the second light wave of wavelength $\lambda_2$ is constituted by the output mirror 3, the first dye vessel 1 containing the first dye solution 1A, the window 4A of the windowed reflecting mirror 4, the second dye vessel 2 containing the second dye solution 2A, and the diffraction grating 6.

Figure 3:
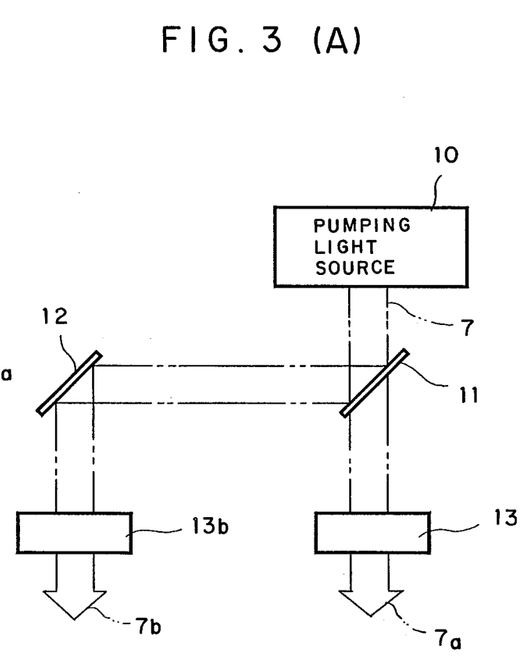

FIG. 3 illustrates pumping means for generating the pumping lights 7a and 7b shown in FIG. 2 in the laser system. In FIG. 3(A), numeral 10 denotes a pumping light source for generating a pumping light 7, the pumping light source 10 being any one of flash lamp, Q switch ruby laser, its second harmonic generation source, molecular ultraviolet laser and YAG laser second harmonic generation source. Numeral 11 denotes a beam splitter for splitting the pumping light 7 emitted from the pumping light source 10 into pumping lights 7a and 7b; numeral 12 denotes a total reflection mirror for directing the pumping light 7b after reflection and splitting by the beam splitter 11 to the same direction as the pumping light 7a; numerals 13a and 13b denote cylindrical lenses for linearly condensing the pumping light 7a which has passed through the beam splitter 11 and the pumping light 7b which has been reflected by the total reflection mirror 12. The first and second dyes in the first and second dye solutions 1A and 2A are disposed in the positions where the pumping lights 7a and 7b are condensed by the cylindrical lenses 13a and 13b, respectively. In FIG. 3(B), numerals 10 and 14 denote first and second pumping light sources, respectively; numeral 15 denotes a synchronizing connection line utilized by the first and second pumping light sources 10 and 14 to synchronize with each other and emit pumping lights 7a and 7c. Cylindrical lenses 13a and 13b condense the pumping lights 7a and 7c, respectively. In this embodiment there is used the pumping means shown in FIG. 3(A). The pumping means shown in FIG. 3(B) can be applied to FIG. 2 by replacing the pumping light 7b in FIG. 2 with the pumping light 7c. In the case of using a helical type flash lamp as the pumping light source, the cylindrical lenses 13a and 13b are not needed. Of course, the dye vessels 1 and 2 are disposed within the helical flash lamp The flash lamp may have helical portions in a number corresponding to the number of dye vessels.

The operation of the above first embodiment will now be explained. The pumping light 7 emitted from the pumping light source 10 is split into pumping lights 7a and 7b by the beam splitter 11. The pumping light 7a is condensed by the cylindrical lens 13a, while at the same time the pumping light 7b is totally reflected by the total reflection mirror 12 and condensed by the cylindrical lens 13b. The thus condensed pumping lights 7a and 7b irradiate the dyes in the first and second dye solutions 1A and 2A, respectively. As a result, the first and second dyes in the first and second dye solutions 1A and 2A assume a state of population inversion, and excited lights of peculiar wavelength regions are provided from the first and second dyes. More specifically, a light wave including the first light wave of wavelength $\lambda_1$ is generated from the first dye in the first solution 1A, while a light wave including the second light wave of wavelength $\lambda_2$ is generated from the second dye in the second solution 2A. The first light wave of wavelength $\lambda_1$ is reflected selectively by the diffraction grating 5 and subjected to laser oscillation in the first light wave oscillating optical resonator 8, whereby it is partially emitted as laser beam of wavelength $\lambda_1$ from the output mirror 3. The second light wave of wavelength $\lambda_2$ is reflected selectively by the diffraction grating 6 and subjected to laser oscillation in the second light wave oscillating optical resonator 9, whereby it is partially emitted as laser beam of wavelength $\lambda_2$ from the output mirror 3. The first light wave of wavelength $\lambda_1$ is subjected to laser oscillation while passing repeatedly the route of output mirror 3⇌first dye solution 1A and first dye vessel 1⇌reflection surface of the windowed reflecting mirror 4⇌first diffraction grating 5. On the other hand, the second light wave of wavelength $\lambda_2$ is subjected to laser oscillation while passing repeatedly the route of output mirror 3⇌ first dye solution 1A and first dye vessel 1⇌window 4A of the windowed reflecting mirror 4⇌second dye solution 2A and second dye vessel 2⇌second diffraction grating 6.

Figure 4:
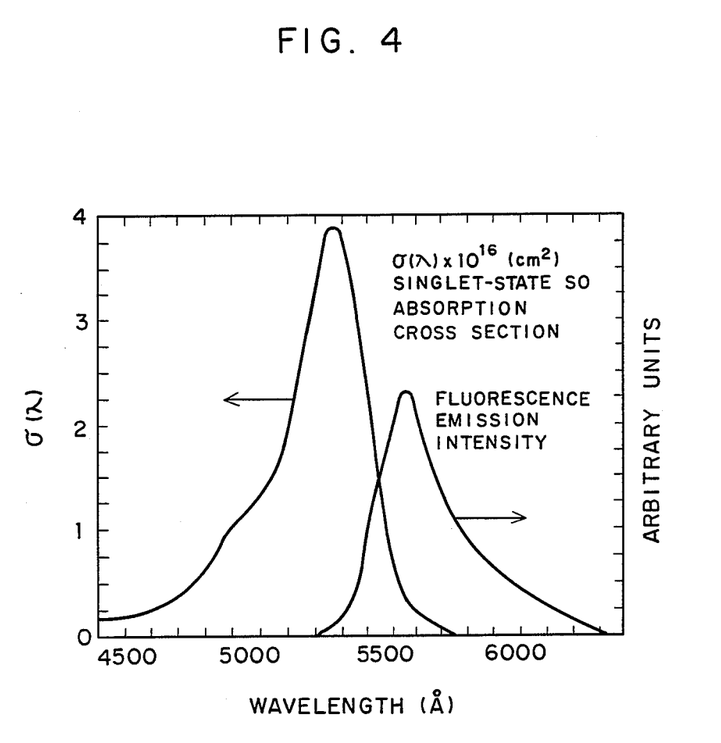
FIG. 4 is a characteristic diagram showing an absorption spectrum of a dye permitting laser oscillation as well as a fluorescence spectrum for laser oscillation.

Singlet-state absorption spectrum of a dye as a laser material and fluorescence spectrum for laser oscillation generally have such characteristics as shown in FIG. 4, in which the absorption spectrum is present on the wavelength side shorter than the wavelength region near the peak of the fluorescence spectrum for laser oscillation. Therefore, assuming that the spectral characteristic shown in FIG. 4 is of the second dye of the second dye solution 2A, the absorption and fluorescence spectra of the first dye in the first dye solution 1A are similar to characteristic curves obtained by moving the spectral curves in FIG. 4 to the shorter wavelength side. Therefore, the wavelength $\lambda_2$ of the second light wave obtained by laser oscillation of the excited light from the second dye in the second dye solution 2A will never enter the wavelength region in which the light absorption of the first dye in the first dye solution 1A is high. Consequently, the second light wave of wavelength $\lambda_2$ reaches the output mirror 3 without being absorbed by the first dye in the first dye solution 1A and is partially reflected thereby to form a second light wave oscillating optical resonance system between the output mirror and the diffraction grating 6. Thus the oscillating operation is performed as if the first dye solution 1A in the first dye vessel 1 were not present.

Since the first and second light waves are generated separately from the first and second dyes in the first and second dye solutions 1A and 2A respectively, it is possible to make the difference between the wavelength $\lambda_1$ of the first light wave and the wavelength $\lambda_2$ of the second light wave large and thereby weaken the interaction of the light waves under oscillation. Consequently, it is possible to realize, on the same axis, optical resonance systems capable of generating light waves of different wavelengths each independently, using the output mirror 3 in common, and thereby effect a multi-wavelength laser oscillation stably.

Thus, the laser beams of greatly different wavelengths $\lambda_1$ and $\lambda_2$ can be emitted simultaneously onto the same axis from the output mirror 3 because the laser oscillation is performed in a state of population inversion of the different dyes in the first and second dye vessels 1 and 2.

Although different dye solutions are used in the above embodiment, it is also possible to obtain laser beams of largely different wavelengths $\lambda_1$ and $\lambda_2$ by using different solvents for the same kind of dye or by changing the solution concentration.

Figure 5:
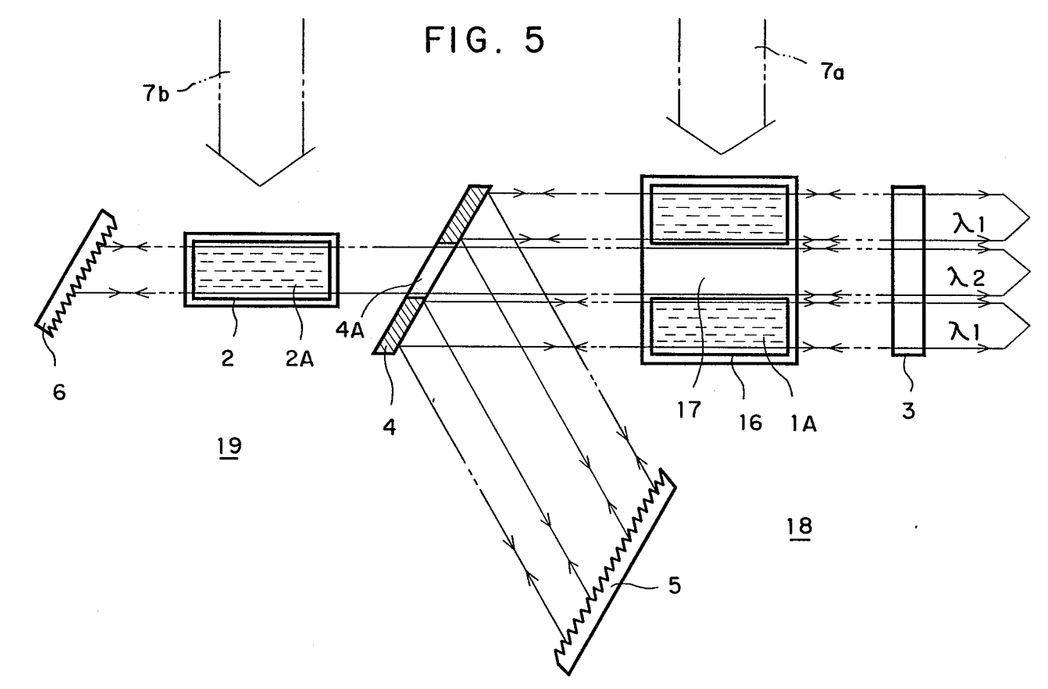
FIG. 5 is a sectional construction diagram illustrating a second embodiment of the present invention.

Referring now to FIG. 5, there is illustrated a second embodiment of the present invention, in which the numeral 16 denotes a first dye vessel which is in the form of a double cylinder having a through hole 17 in a central part. The vessel 16 contains the first dye solution 1A annularly between the two cylinders. The laser system of FIG. 5 is different from the laser system of FIG. 2 in that the first dye vessel 16 is disposed in the position of the first dye vessel 1 shown in FIG. 2. The through hole 17, window 4A and second dye solution 2A are disposed in opposed relation to permit passing of the same beam therethrough. Numeral 18 denotes an optical resonator for the first light wave of wavelength $\lambda_1$, constituted by output mirror 3, first dye vessel 16 containing the first dye solution 1A, reflection surface of the windowed reflecting mirror 4 and first diffraction grating 5, while numeral 19 denotes an optical resonator for the second light wave of wavelength $\lambda_2$, constituted by output mirror 3, through hole 17 of the first dye vessel 16, window 4A of the windowed reflecting mirror 4, second dye vessel 2 containing the second dye solution 2A and second diffraction grating 6.

In this second embodiment, the second light wave of wavelength $\lambda_2$ which is subjected to laser oscillation by the optical resonator 17 passes the through hole 19, that is, it never passes through the first dye solution 1A, and therefore it is not necessary at all to consider the influence of the first dye in the first dye solution 1A upon the second light wave. Moreover, even if the same dye is used in the first and second dye solutions 1A and 2A, it is possible to generate first and second light waves having a large wavelength difference by using different solution concentrations and/or different solvents.

In operation of this second embodiment, pumping lights 7a and 7b are radiated simultaneously to the first and second solutions 1A and 2A by the pumping means shown in FIG. 3(A), whereby the light wave of wavelength $\lambda_1$ in an excited light generated from the first dye in the first solution 1A is subjected to laser oscillation in the optical resonator 18, while the light wave of wavelength $\lambda_2$ in an excited light generated from the second dye in the second solution 2A is subjected to laser oscillation in the optical resonator 19, to emit a laser beam of wavelength $\lambda_1$ and a laser beam of wavelength $\lambda_2$ simultaneously onto the same central axis from the output mirror 3.

Figure 6:
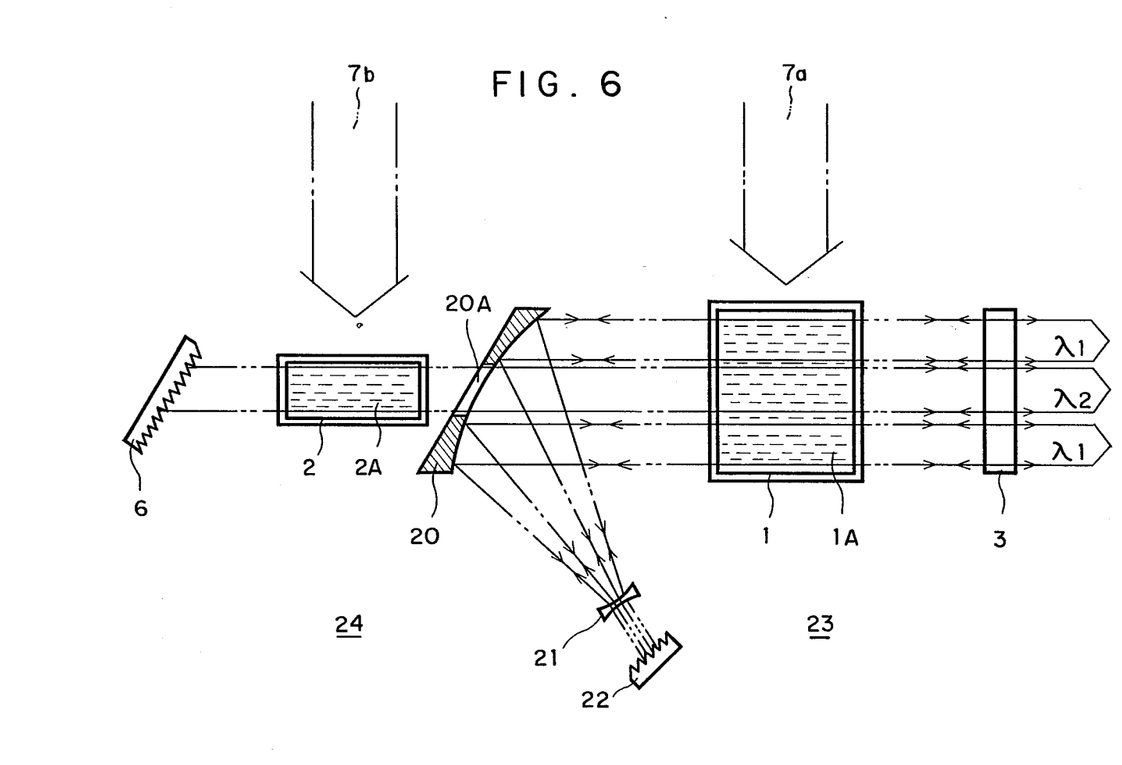
FIG. 6 is a sectional construction diagram illustrating a third embodiment of the present invention.

Referring now to FIG. 6, there is illustrated a third embodiment of the present invention, in which the numeral 20 denotes a concave mirror having a central hole or window 20A formed of a light transmitting material, the concave mirror 20 being disposed between the first and second dye vessels 1 and 2 so that its axis is an oblique angle to the plane reflection surface of the output mirror 3. Numeral 21 denotes a concave lens disposed near the position where the beam reflected by the concave mirror 20 is converged, the concave lens 21 functioning to receive and collimate the reflected beam. Numeral 22 denotes a diffraction grating as wavelength selecting means so positioned as to selectively diffract a specific wavelength portion of the beam from the concave lens 21 and reflect it toward the same concave lens at a high reflectance. The other components indicated by the same reference numerals as in FIG. 2 are of the same constructions as in that figure. Numeral 23 denotes an optical resonator for the light wave of wavelength $\lambda_1$, constituted by output mirror 3, first dye solution 1A and first dye vessel 1, as well as the reflection surface of the concave mirror 20, concave lens 21 and diffraction grating 22, while numeral 24 denotes an optical resonator for the light wave of wavelength $\lambda_2$, constituted by output mirror 3, first dye solution 1A and first dye vessel 1, window 20A of the concave mirror 20, second dye solution 2A and second dye vessel 2, and diffraction grating 6.

In this third embodiment, the beam reflected by the reflection surface of the concave mirror 20 is converged and received by the concave lens 21 of a small size, which in turn emits the beam as a collimated beam to the diffraction grating 22 of a small size, and therefore it is possible to realize a compact laser system as compared with the laser system shown in FIG. 2. Of course, the first dye vessel 16 shown in FIG. 5 may be used in place of the first dye vessel shown in FIG. 6.

Although a diffraction grating was used as wavelength selecting means in the above embodiments, the wavelength selecting means may be constituted by utilizing the spectral characteristic of a prism so that a specific wavelength beam directed in a specific direction from the prism is again reflected toward the prism by a total reflection mirror. Also in the embodiments of FIGS. 5 and 6, a polarizer, ND filter, or beam expander, may be disposed in positions corresponding to the positions indicated by dash-dot lines 5a and 6a in the embodiment of FIG. 2.

Figure 7:
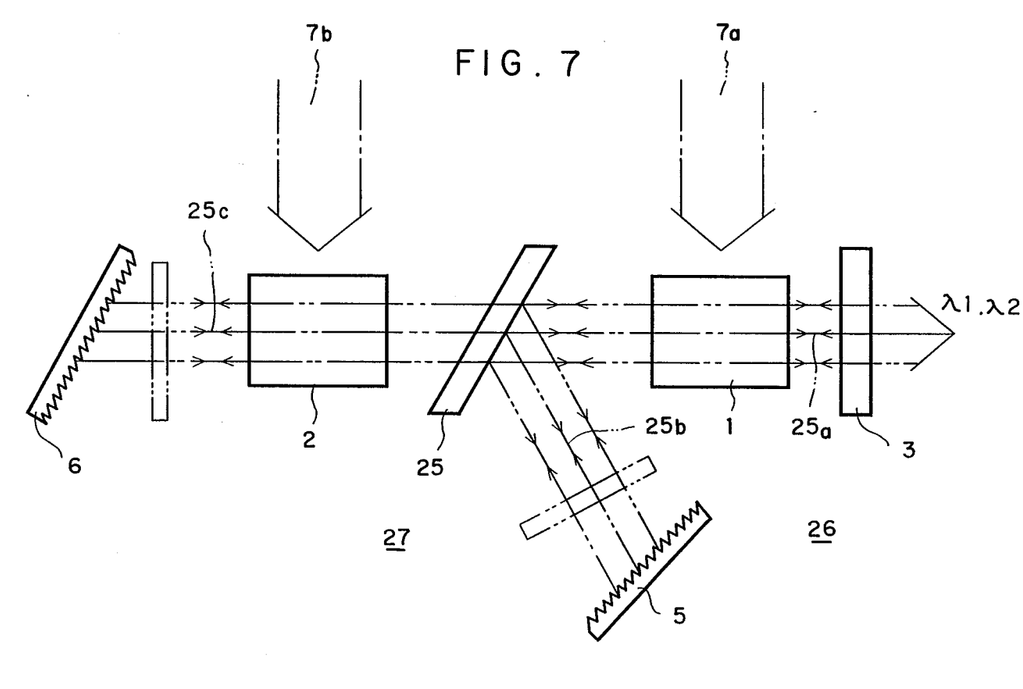
FIG. 7 is a construction diagram illustrating a fourth embodiment of the present invention.

Referring now to FIG. 7, there is illustrated a fourth embodiment of the present invention, in which numeral 25 denotes a beam splitter disposed between the first and second dye vessels 1 and 2 so that its reflection surface is inclined in opposed relation to the reflection surface of the output mirror 3. The beam splitter 25 splits an optical resonator axis 25a into an optical resonator axis 25b for the light wave of wavelength $\lambda_1$ and an optical resonator axis 25c for the light wave of wavelength $\lambda_2$. The first and second dye vessels 1 and 2 contain such a combination of dyes that the wavelength $\lambda_1$ is shorter than the wavelength $\lambda_2$. The difference between the wavelength $\lambda_1$ and $\lambda_2$ is larger than the maximum wavelength difference between multi-wavelength laser beams generated using a single dye.

In the multi-wavelength laser system constructed as above, an optical resonator 26 for the first light wave of wavelength $\lambda_1$ is constituted by output mirror 3, first dye vessel 1 containing a dye solution, beam splitter 25 and diffraction grating 5, while an optical resonator 27 for the second light wave of wavelength $\lambda$hd 2 is constituted by output mirror 3, first dye vessel 1 containing a dye solution, beam splitter 25, second dye vessel 2 containing a dye solution, and diffraction grating 6. The axis of the optical resonator 26 for the first light wave comprises 25a and 25b, while that of the optical resonator for the second light wave comprises 25a and 25c.

The operation of this fourth embodiment will now be explained. Pumping light 7 emitted from the pumping light source 10 shown in FIG. 3(A) is split into pumping lights 7a and 7b by the beam splitter 11. The pumping light 7a is condensed by the cylindrical lens 13a, while at the same time the pumping light 7b is totally reflected by the total reflection mirror 12 and condensed by the cylindrical lens 13b. The thus-condensed pumping lights 7a and 7b irradiate the dyes in the dye vessels 1 and 2 simultaneously. As a result, the dyes in the first and second dye vessels 1 and 2 assume a state of population inversion, generating excited lights. More specifically, a light wave including the first light wave of wavelength $\lambda_1$ is generated from the dye in the first dye vessel 1, while a light wave including the second light wave of wavelength $\lambda_2$ is generated from the dye in the second dye vessel 2. The first light wave of wavelength $\lambda_1$ is reflected selectively by the diffraction grating 5 and subjected to laser oscillation in the first light wave oscillating optical resonator 26, whereby it is partially emitted as a laser beam of wavelength $\lambda_1$ from the output mirror 3, while the second light wave of wavelength $\lambda_2$ is selectively reflected by the diffraction grating 6 and subjected to laser oscillation in the second light wave oscillating optical resonator 27, whereby it is partially emitted as a laser beam of wavelength $\lambda_2$ from the output mirror 3.

Thus, the first and second light waves are generated from different dyes separately contained in the dye vessels 1 and 2, so it is possible to make the difference between the first light wave wavelength $\lambda_1$ and the second light wave wavelength $\lambda_2$ large and thereby weaken the interaction of the light waves under oscillation.

Consequently, it is possible to realize optical resonance systems capable of generating light waves of different wavelengths each independently on the same axis 25a, using the output mirror 3 in common, thereby permitting a stable multi-wavelength laser oscillation.

Although in the above fourth embodiment the axis of the first laser oscillation resonator 26 is separated from the axis of the second laser oscillation resonator 27 by means of the beam splitter 25, the separation of the first and second light waves can be improved by using a dielectric multilayer film mirror so that the reflectance of the reflection surface of the beam splitter 25 becomes maximum against a light wave of a specific wavelength in the wavelength region for laser oscillation of the dye contained in the first dye vessel 1. Moreover, a polarizer may be disposed between the beam splitter 25 and the diffraction grating 5 and also between the diffraction grating 6 and the second dye vessel 2, as indicated by dash-dot lines 5a and 6a to permit an efficient incidence of only the first and second light waves upon the diffraction gratings 5 and 6. In place of disposing a polarizer between the second dye vessel 2 and the diffraction grating 6, the beam splitter 25 may be constituted by a polarizing beam splitter. Further, the polarizers may be substituted by ND filters or beam expanders.

Figure 8:
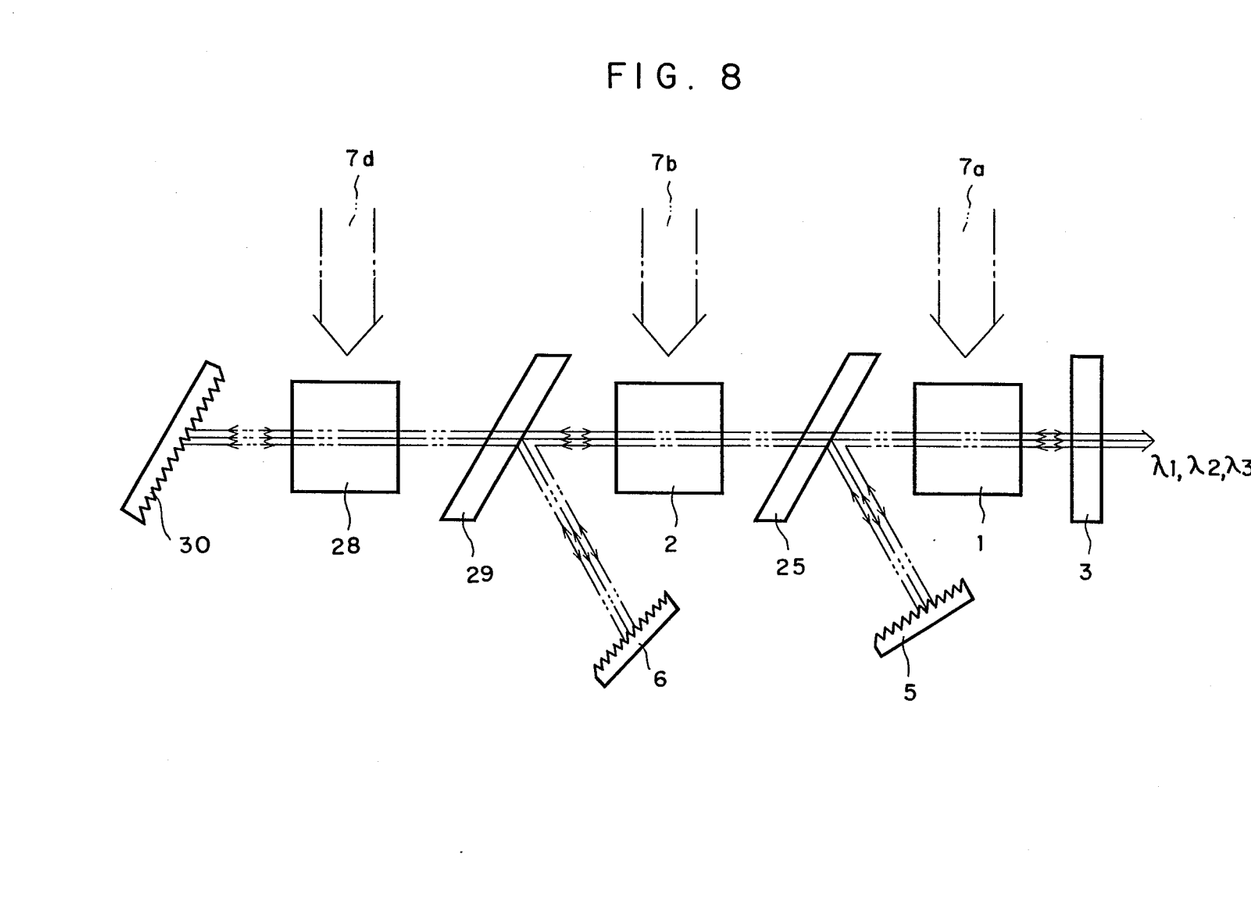
FIG. 8 is a construction diagram illustrating a fifth embodiment of the present invention which is for the generation of laser beams of three wavelengths.

Referring now to FIG. 8, there is illustrated a laser system for light waves of three wavelengths $\lambda_1$, $\lambda_2$ and $\lambda_3$ according to a fifth embodiment of the invention, in which the numeral 28 denotes a third dye vessel which contains a third dye solution consisting of a dye as a laser material for the third light wave of wavelength $\lambda_3$ and a solvent for the dye. Numeral 29 denotes a beam splitter and numeral 30 denotes a diffraction grating for receiving and reflecting the light wave of wavelength $\lambda_3$ selectively at a high reflectance. First and second dye vessels 1 and 2, output mirror 3, beam splitter 25 and diffraction grating 5 are of the same constructions as in FIG. 7. Behind the second dye vessel 2 are disposed the beam splitter 29, third dye vessel 28 and diffraction grating 30 in this order, and the diffraction grating 6 is so positioned as to receive and reflect the second light wave of wavelength $\lambda_2$ reflected by the beam splitter 29. The wavelength $\lambda_3$ is shorter than the wavelength $\lambda_2$. An optical resonator for the light wave of wavelength $\lambda_1$ is of the same construction as in FIG. 7, but an optical resonator for the light wave of wavelength $\lambda_2$ is constituted by output mirror 3, first dye vessel 1 containing a first dye solution, beam splitter 25, second dye vessel 2 containing a second dye solution, beam splitter 29 and diffraction grating 6, and an optical resonator for the light wave of wavelength $\lambda_3$ is constituted by the other components than the diffraction gratings 5 and 6. For laser oscillation, pumping lights 7a, 7b and 7d are radiated simultaneously to the dyes in the first to third dye vessels 1, 2 and 28, whereby light waves of wavelengths $\lambda_1$, $\lambda_2$ and $\lambda_3$ are generated and laser beams of those three kinds of wavelengths are emitted from the output mirror 3.

Figure 9:
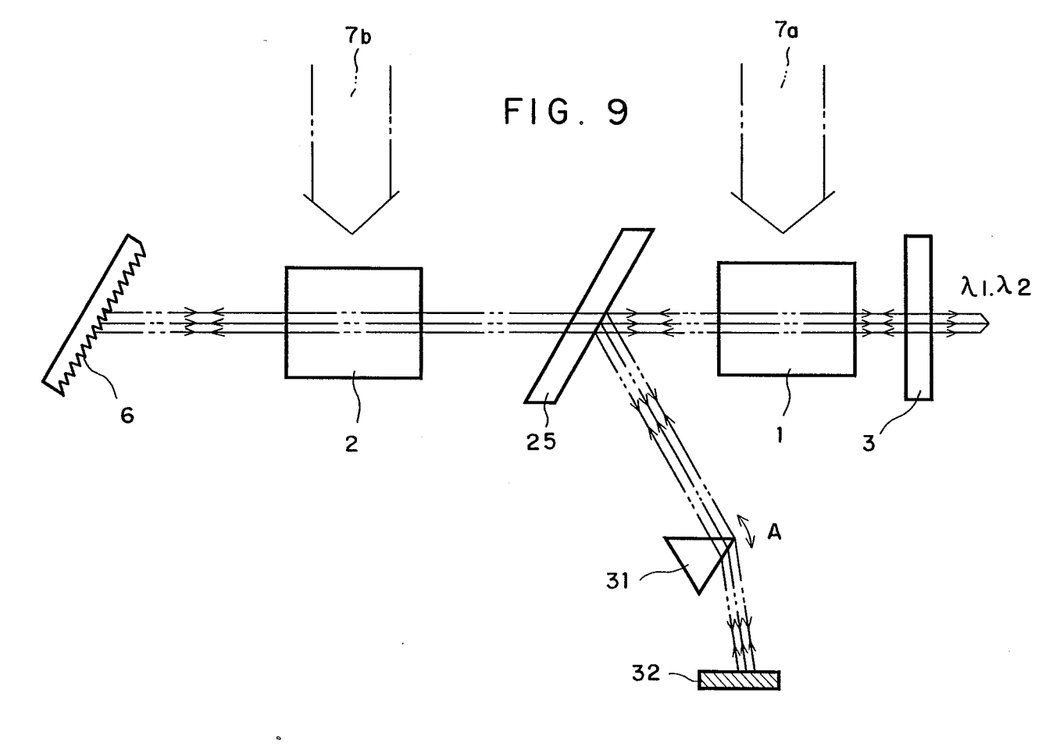
FIG. 9 is a construction diagram illustrating a sixth embodiment of the present invention in which a wavelength selection mechanism having selectivity for a specific wavelength of light wave is constituted by a prism and a total reflection mirror.

Referring now to FIG. 9, there is illustrated a sixth embodiment of the present invention, which is different from the embodiment of FIG. 7 in that the laser system of FIG. 7 employs the diffraction grating 5 as means for selecting the light wave of wavelength $\lambda_1$, while the laser system of FIG. 9 employs a prism 31 and a total reflection mirror 32 in place of the diffraction grating 5. The total reflection mirror 32 is allowed to have a certain range of movement by making the distance between the prism 31 and the total reflection mirror 32 large. For the selection of a specific wavelength of light wave in this sixth embodiment, the prism 31 is turned in the direction of arrow A in the figure to change the wavelength of light wave incident upon the total reflection mirror 32, or the prism 31 is fixed and the total reflection mirror 32 is moved to a position where it receives a beam of a specific wavelength from the prism 31. It goes without saying that the selection of a specific wavelength of light wave can be done by performing both the rotation of the prism 31 and the movement of the total reflection mirror 32. The diffraction grating 6 may also be substituted by such wavelength selecting means consisting of a prism and a total reflection mirror.

What is claimed is:

1. A laser system comprising:
   a plurality of dye vessels which are disposed in series at predetermined intervals and each of which contains a lasing dye and a solvent for the dye, said dyes generating light waves of different laser oscillation wavelengths when subjected to pumping;
   a translucent output mirror means disposed on one side of said dye vessels and used for both laser transmission and oscillation;
   reflecting mirror means disposed inclinedly between said dye vessels, said reflecting mirror means having a window formed centrally thereof;
   a first wavelength selecting means positioned so that a specific wavelength portion of a beam reflected by said reflecting mirror means is reflected selectively at a high reflectance toward said reflecting mirror means;
   a second wavelength selecting means disposed on an opposite side of said dye vessels and functioning to reflect a specific wavelength portion of a beam passing through the window of said reflecting mirror means, selectively at a high reflectance toward said output mirror means; and
   pumping means positioned so that a pumping light is directed toward each of said lasing dyes.

2. A laser system as set forth in claim 1, wherein said pumping means radiates said pumping light to said plural being dyes simultaneously.

3. A laser system as set forth in claim 1, using a flash lamp as said pumping means.

4. A laser system as set forth in claim 3, wherein said flash lamp is a single flash lamp having a plurality of helical portions.

5. A laser system as set forth in claim 3, wherein said flash lamp is provided in plural numbers which are synchronized to output a flash lamp light.

6. A laser system as set forth in claim 1, wherein at least one of said first wavelength selecting means and said second wavelength selecting means is constituted by a diffraction grating.

7. A laser system as set forth in claim 1, wherein at least one of said first wavelength selecting means and said second wavelength selecting means is constituted by a combination of a prism and a total reflecting mirror.

8. A laser system as set forth in claim 1, wherein at least one said reflecting mirror means is a plane reflecting mirror.

9. A laser system as set forth in claim 1, wherein at least one said reflecting mirror means is a concave reflecting mirror.

10. A laser system as set forth in claim 9, including a concave lens disposed in a position in which the beam reflected by said concave reflecting mirror is collimated.

11. A laser system comprising:
    an output mirror means which is used for both laser transmission and oscillation;
    reflecting mirror means disposed inclinedly at a redetermined spacing on one side of said output mirror and having a window formed centrally thereof;
    a first light-transmitting dye vessel positioned adjacent said reflecting mirror means on a side close to said output mirror means, said first dye vessel having a through hole formed in position aligned with the window of said reflecting mirror means and containing a first lasing dye and a solvent for the dye, said first lasing dye producing a stimulated light output upon pumping;
    a second light-transmitting dye vessel so positioned as to put said reflecting mirror means between it and said output mirror means, said second dye vessel containing a second lasing dye and a solvent for the dye, said second lasing dye producing upon pumping a stimulated light output having a wavelength different from that of the stimulated light output produced by said first lasing dye in said first dye vessel;
    a first wavelength selecting means positioned so that a specific wavelength portion of a beam reflected by said reflecting mirror means is reflected selectively at a high reflectance toward said reflecting mirror means;
    a second wavelength selecting mean so positioned as to put said second dye vessel between it and said output mirror means; and
    pumping means positioned so that a pumping light is directed toward each said lasing dye.

12. A laser system as set forth in claim 11, wherein said pumping means radiates said pumping light to said plural lasing dyes simultaneously.

13. A laser system as set forth in claim 11, using a flash lamp as said pumping means.

14. A laser system as set forth in claim 13, wherein said flash lamp is a single flash lamp having a plurality of helical portions.

15. A laser system as set forth in claim 13, wherein said flash lamp is provided in plural numbers which are synchronized to output a flash lamp light.

16. A laser system as set forth in claim 11, wherein at least one of said first wavelength selecting means and/or said second wavelength selecting means is constituted by a diffraction grating.

17. A laser system as set forth in claim 11, wherein at least one of said first wavelength selecting means and said second wavelength selecting means is constituted by a combination of a prism and a total reflecting mirror.

18. A laser system as set forth in claim 11, wherein at least one said reflecting mirror means is a plane reflecting mirror.

19. A laser system as set forth in claim 11, wherein at least one said reflecting mirror means is a concave reflecting mirror.

20. A laser system as set forth in claim 19, including a concave lens disposed in a position in which the beam reflected by said concave reflecting mirror is collimated.

21. A laser system comprising:
   a plurality of dye vessels which are disposed in series at predetermined intervals and each of which contains a lasing dye and a solvent for the dye, said lasing dyes generatng light waves of different laser oscillation wavelengths when subjected to pumping;
   a translucent output mirror means disposed on one side of said plural dye vessels and used for both laser transmission and oscillation;
   a beam splitter disposed between said dye vessels for splitting light waves reflected from said output mirror means;
   a first wavelength selecting means disposed in an incident portion of the light wave reflected by said beam splitter and functioning to reflect a specific wavelength portion selectively;
   a second wavelength selecting means disposed on an opposite side of said dye vessels and functioning to reflect a specific wavelength portion selectively; and
   pumping means positioned so that a pumping light is directed toward each said lasing dyes.

22. A laser system as set forth in claim 21, wherein the reflectance of said beam splitter is set maximum for a specific wavelength portion of light wave generated by pumping of the dye in the dye vessel disposed on the side of said output mirror adjacent to said beam splitter.

23. A laser system as set forth in claim 21, wherein said pumping means radiates the pumping light to said lasing dyes simultaneously.

24. A laser system as set forth in claim 21, using a flash lamp light as the pumping light of said pumping means.

25. A laser system as set forth in claim 21, wherein at least one of said first wavelength selecting means and said second wavelength selecting means is constituted by a diffraction grating.

26. A laser system as set forth in claim 21, wherein at least one of said first wavelength selecting means and said second wavelength selecting means is constituted by a combination of a prism and a total reflection mirror.

27. A laser system including: a first light wave oscillating optical resonator for emitting a first laser beam of a first wavelength and a second light wave oscillating optical resonator for emitting a second laser beam of a second wavelength different from the first wavelength, said first light wave oscillating optical resonator comprising:
   a first dye vessel made of a light-transmitting material, said first dye vessel containing a first lasing dye solution which produces a first light wave including said first wavelength when subjected to pumping;
   beam splitting means for receiving and splitting beams which have passed through said first dye vessel into at least two directions; and
   a first wavelength selecting means for receiving one beam from said beam splitting means and reflecting a light wave of the first wavelength in the received beam selectively at a high reflectance toward said laser beam emitting means through said beam splitting means and said firt dye vessel,
   said second light wave oscillating optical resonator including;
   a second dye vessel which contains a second lasing dye solution which produces a second light wave including said second wavelength and upon which is incident the other beam from said beam splitting means; and
   a second wavelength selecting means for receiving the beam which has passed through said second dye vessel and reflecting a light wave of the second wavelength in the received beam selectively at a high reflectance toward said laser beam emitting means through said second dye vessel.

28. A laser system as set forth in claim 27, wherein at least said first dye vessel, said beam splitting means and said second dye vessel are disposed on a single straight line, and said beam splitting means is disposed inclinedly between said first and second dye vessels and has a light-transmitting window portion formed centrally, the side face around said window portion on the side of said first dye vessel being a light reflecting face.

29. A laser system as set forth in claim 28, wherein said first dye vessel has a through hole formed in a position aligned with the window portion of said beam splitting means and contains the first lasing dye around said through hole.

* * * * *

UNITED STATES PATENT AND TRADEMARK OFFICE
CERTIFICATE OF CORRECTION

PATENT NO. : 4,710,937

DATED : December 1, 1987

INVENTOR(S) : Tatsuo Oomori et al.

It is certified that error appears in the above-identified patent and that said Letters Patent is hereby corrected as shown below:

Column 7, line 38, "$\lambda$hd 2" should be --$\lambda_2$--.

Column 8, line 29, after "6a" insert --,--.

Column 9, line 53, delete "being" and substitute therefor --lasing--.

Signed and Sealed this

Twenty-sixth Day of July, 1988

Attest:

DONALD J. QUIGG

Attesting Officer      Commissioner of Patents and Trademarks